United States Patent [19]

Motoyama et al.

[11] Patent Number: 5,181,493
[45] Date of Patent: Jan. 26, 1993

[54] OPERATION CONTROL DEVICE FOR IN-CYLINDER INJECTION ENGINE

[75] Inventors: Yu Motoyama; Ryusuke Katoh, both of Iwata, Japan

[73] Assignee: Yamaha Hatsudoki Kabushiki Kaisha, Iwata, Japan

[21] Appl. No.: 705,293

[22] Filed: May 24, 1991

[30] Foreign Application Priority Data

May 25, 1990 [JP] Japan .................................. 2-136644

[51] Int. Cl.$^5$ ............................................. F02B 7/00
[52] U.S. Cl. .................................. 123/431; 123/73 A
[58] Field of Search ............. 123/431, 479, 480, 73 A, 123/73 C, 585

[56] References Cited

U.S. PATENT DOCUMENTS

| | | | |
|---|---|---|---|
| 3,924,598 | 12/1975 | Davis | 123/431 |
| 4,286,553 | 9/1981 | Baltz et al. | 123/73 A |
| 4,750,128 | 6/1988 | Honda et al. | 123/479 |
| 4,765,229 | 8/1988 | Wataya et al. | 123/479 |
| 4,779,581 | 10/1988 | Maier | 123/73 A |
| 4,779,598 | 10/1988 | Billingsly et al. | 123/73 A |
| 4,785,771 | 11/1988 | Ibaki et al. | 123/479 |
| 4,917,053 | 4/1990 | Okazaki et al. | 123/73 A |

Primary Examiner—Raymond A. Nelli
Attorney, Agent, or Firm—Ernest A. Beutler

[57] ABSTRACT

A fuel injection system and method of operating it for a two-stroke crankcase compression internal combustion engine. The engine is provided with a main fuel injector that injects fuel directly into the combustion chamber and an auxiliary fuel injector that injects fuel into the inductions system. A throttle valve controls the flow through the induction system. The system includes a detector for detecting an abnormality in the operation of the main fuel injector and shuts the main fuel injector down when this occurs and increases the amount of fuel supplied by the auxiliary fuel injection. When this abnormal operating condition occurs, the degree of opening of the throttle valve is also reduced.

39 Claims, 5 Drawing Sheets

OPERATION CONTROL DEVICE FOR IN-CYLINDER INJECTION ENGINE

BACKGROUND OF THE INVENTION

This invention relates to an operation control device for an in-cylinder injection engine and more particularly to an improved fuel injection system for an engine and method of operating it.

It has been recognized that there are certain advantages in providing direct cylinder injection. With in-cylinder or direct injection engines, it is possible to operate the engine on a leaner fuel and air mixture than with an engine wherein the fuel and air is mixed before it is admitted to the combustion chamber. With direct cylinder injection, it is possible to have a stratification effect wherein there will be a stoichiometric charge at the spark plug at the time ignition is commenced wherein the remainder of the combustion chamber is charged with primarily pure air. The advantages of such systems are obvious. However, with certain types of engines and under certain conditions, it is desirable to provide additional fuel to the combustion chamber through the induction system. For example, with two-cycle crankcase compression engines there is a desirability of providing a portion of the fuel charge for the engine to the combustion chamber through the induction system including the crankcase. This will assist in cooling under high speed, high load conditions.

There may be instances wherein it is possible to determine that the main, direct cylinder injector has malfunctioned. When this occurs, it may be desirable to discontinue the supply of fuel from this injector.

It is, therefore, a principal object of this invention to provide an injection system for an internal combustion engine having a direct cylinder injector and an induction system injector and wherein means are provided for detecting an abnormality in the main injector and in that event the main injector may be shut down.

It is a further object of this invention to provide an improved injection system for an engine including both direct and manifold injection systems.

When direct cylinder injection is employed, it has been the practice to open the throttle valve to a greater extent than is done when the fuel/air mixture is admitted to the combustion chamber through the induction system. That is, when only direct cylinder injection is employed, it is the normal practice to employ greater throttle valve settings than when other forms of fuel delivery are employed. Therefore, if the system is provided with both direct main fuel injectors and manifold injectors and the fuel supply is provided only by the manifold injector in the event of malfunction of the main injector, the engine may experience a sudden speed increase.

It is, therefore, a further object to this invention to provide an improved throttle control arrangement for an engine having both main direct fuel injection and manifold fuel injection.

SUMMARY OF THE INVENTION

This invention is adapted to be embodied in a fuel injection system for an internal combustion engine having a combustion chamber and a induction system for introducing a charge into the combustion chamber. Throttle valve means are incorporated for controlling the flow through the induction system. A main fuel injector injects fuel directly into the combustion chamber and an auxiliary fuel injector injects fuel into the induction system. Means are provided for sensing an abnormal condition of the main fuel injector and means are provided for operating the auxiliary fuel injector to supply a different amount of fuel to the engine in the event an abnormal condition of the main fuel injector is sensed.

Another feature of the invention is adapted to be embodied in a method for controlling a fuel injection system for an internal combustion engine having a combustion chamber and an induction system with a main fuel injector that injects fuel directly into the combustion chamber and an auxiliary fuel injector that injects fuel into its induction system. In accordance with the method, the operation of the main fuel injector is sensed and when an abnormal condition is sensed the amount of fuel supplied by the auxiliary fuel injector is changed.

DETAILED DESCRIPTION OF THE PREFERRED EMBODIMENT OF THE INVENTION

Figure 1:
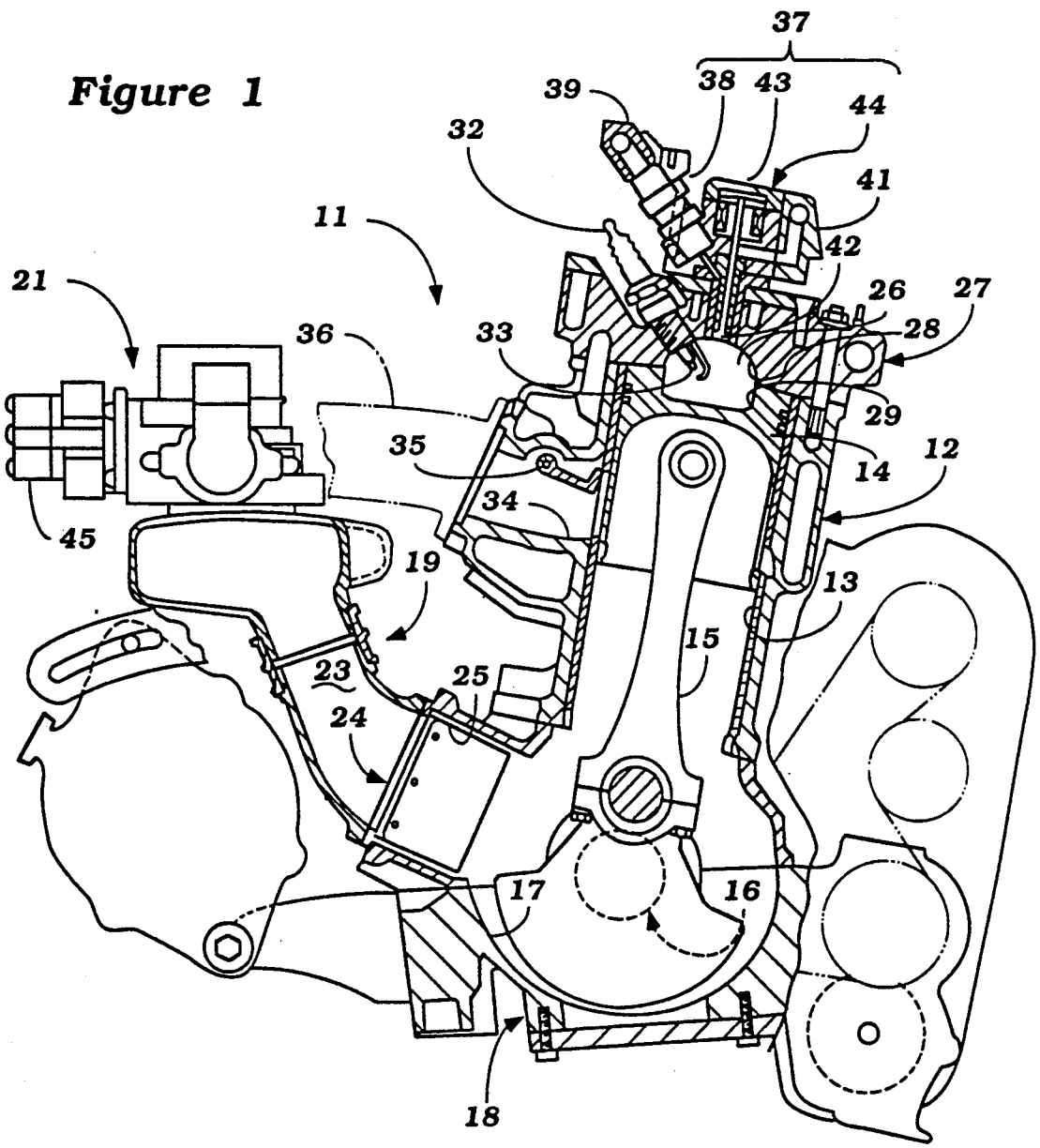
FIG. 1 is a cross-sectional view taken through a single cylinder of a multiple cylinder fuel injected engine constructed and operated in accordance with an embodiment of the invention.
Figure 2:
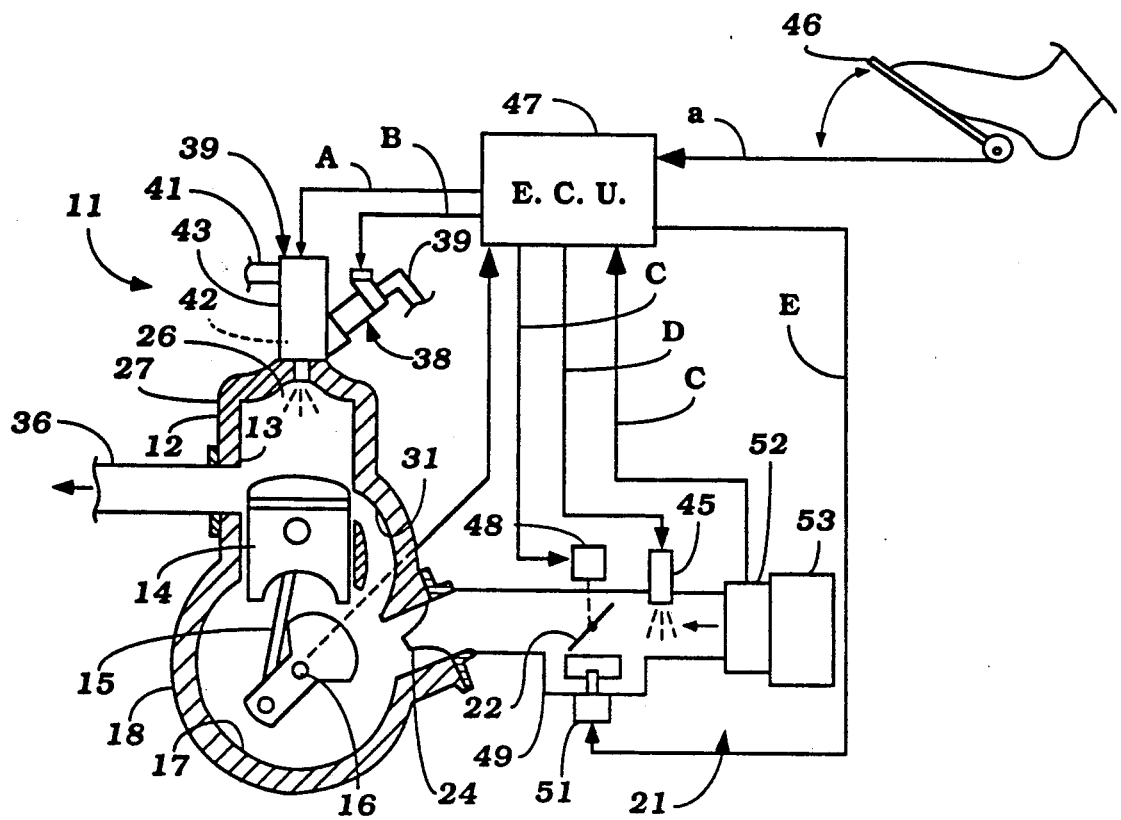
FIG. 2 is a cross-sectional view of the engine in schematic form and shows the fuel injection control system for the engine.
Figure 3:
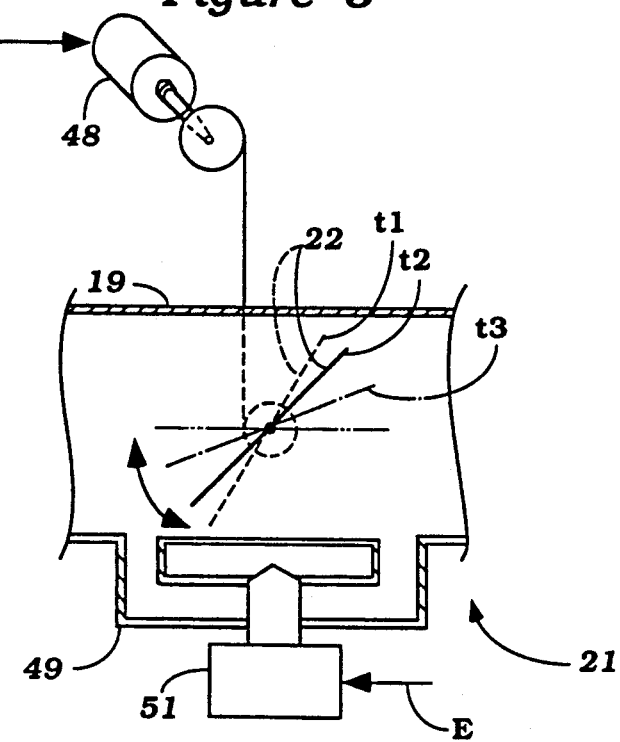
FIG. 3 is a further enlarged cross-sectional view taken through the throttle valve and idle air supply for the engine.

Referring first in detail to FIGS. 1 and 2, an internal combustion engine constructed and operated in accordance with an embodiment of the invention is identified generally by the reference numeral 11 and is shown in cross-section through a single cylinder. In the illustrated embodiment, the engine 11 is of the three cylinder in-line type and operates on a crankcase compression two-stroke principle. It is to be understood, however, that the invention may be practiced equally as well with engines having other cylinder numbers or other cylinder configurations or, in fact, rotary type engines. The invention may also be employed in conjunction with operation on other than the two-stroke crankcase compression principle. However, the invention has particular utility in conjunction with two-stroke crankcase compression internal combustion engines.

The engine 11 is comprised of a cylinder block assembly, indicated generally by the reference numeral 12, in which three cylinder bores 13 are formed in aligned relationship by pressedin cylinder liners. Pistons 14 reciprocate in each of the cylinder bores 13 and are connected by means of connecting rods 15 to individual throws of a crankshaft 16. The crankshaft 16 is rotatably journalled within a crankcase chamber 17 formed by the skirt of the cylinder block 12 and by a crankcase member 18 that is affixed to the base of the cylinder block in a known manner. As is typically with two-cycle engine practice, the crankcase chamber 17 is divided into separate sealed chambers each communicating with a respective one of the cylinder bores 13 and pistons 14.

An intake charge is delivered to the crankcase chambers 17 during the upward movement of the pistons 14 through an induction system, indicated generally by the reference numeral 19. This induction system 19 includes a throttle body 21 that receives air from a suitable air inlet device (not shown in FIG. 1) and which has a throttle valve 22 formed in a common portion thereof. From this common portion, the induction system includes individual manifold runners 23 each of which extends to a respective crankcase chamber 17. A reed-type check valve 24 is positioned in a manifold passage 25 formed by the crankcase member 18 or by a separate member affixed to it for permitting flow into the crankcase chamber 17 but precluding reverse flow.

The charge which is admitted to the crankcase chamber 17 is transferred to a combustion chamber 26 formed above the head of the piston 14 by the piston head, cylinder bore 13 and a cylinder head assembly 27 that is affixed to the cylinder block 12 in an appropriate manner. In the illustrated embodiment, the combustion chamber 26 is formed by a recess 28 in the cylinder head and by a recess or bowl 29 formed in the head of the piston 14.

The charge is transferred from the crankcase chamber 17 to the combustion chambers 27 by one or more scavenge passages, indicated at 31 in FIG. 2. A fuel/air charge is formed in the combustion chambers 26 in a manner which will be described and is fired by a spark plug 32 that is mounted in the cylinder head 27 and which has its gap 33 disposed approximately at the center of the combustion chamber 26. The spark plugs 32 are fired in an appropriate manner.

The burning gases expand and drive the piston 14 downwardly and are then exhausted through exhaust ports 34 formed in the cylinder block 13. If desired, an exhaust control valve 35 may be positioned in the exhaust ports 34 for controlling the timing and duration of the exhaust portion of the cycle. The exhaust gases are delivered from the exhaust ports 34 to an exhaust manifold 36 for discharge to the atmosphere through a suitable silencing device and exhaust system (not shown).

Figure 4:
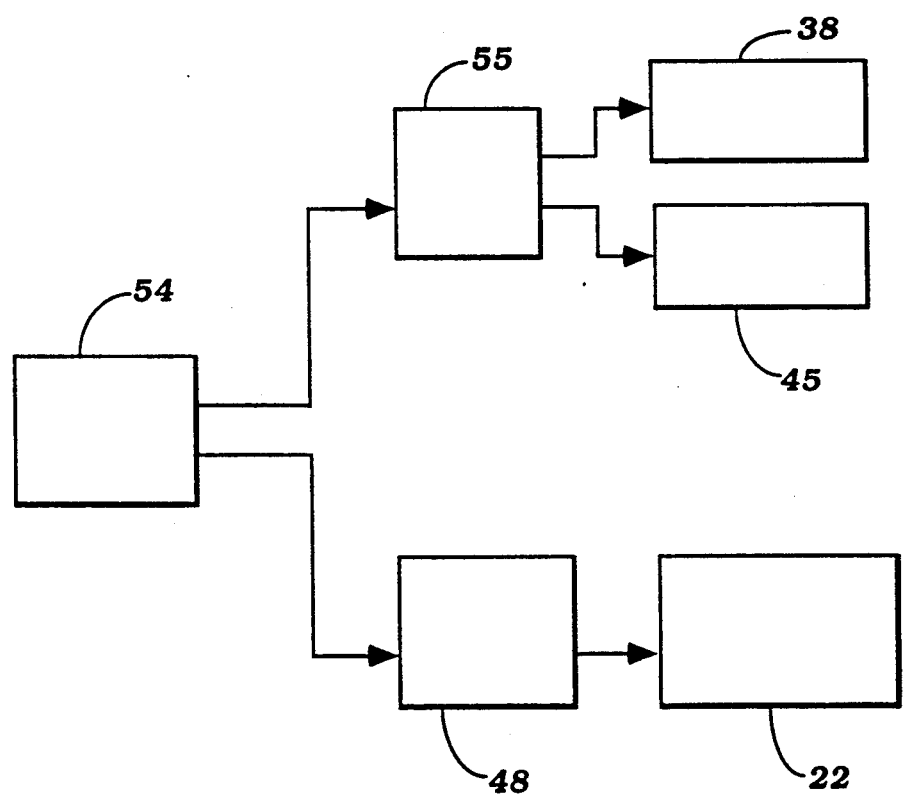
FIG. 4 is a schematic block diagram showing the control components for the fuel injection of the engine.
Figure 5:
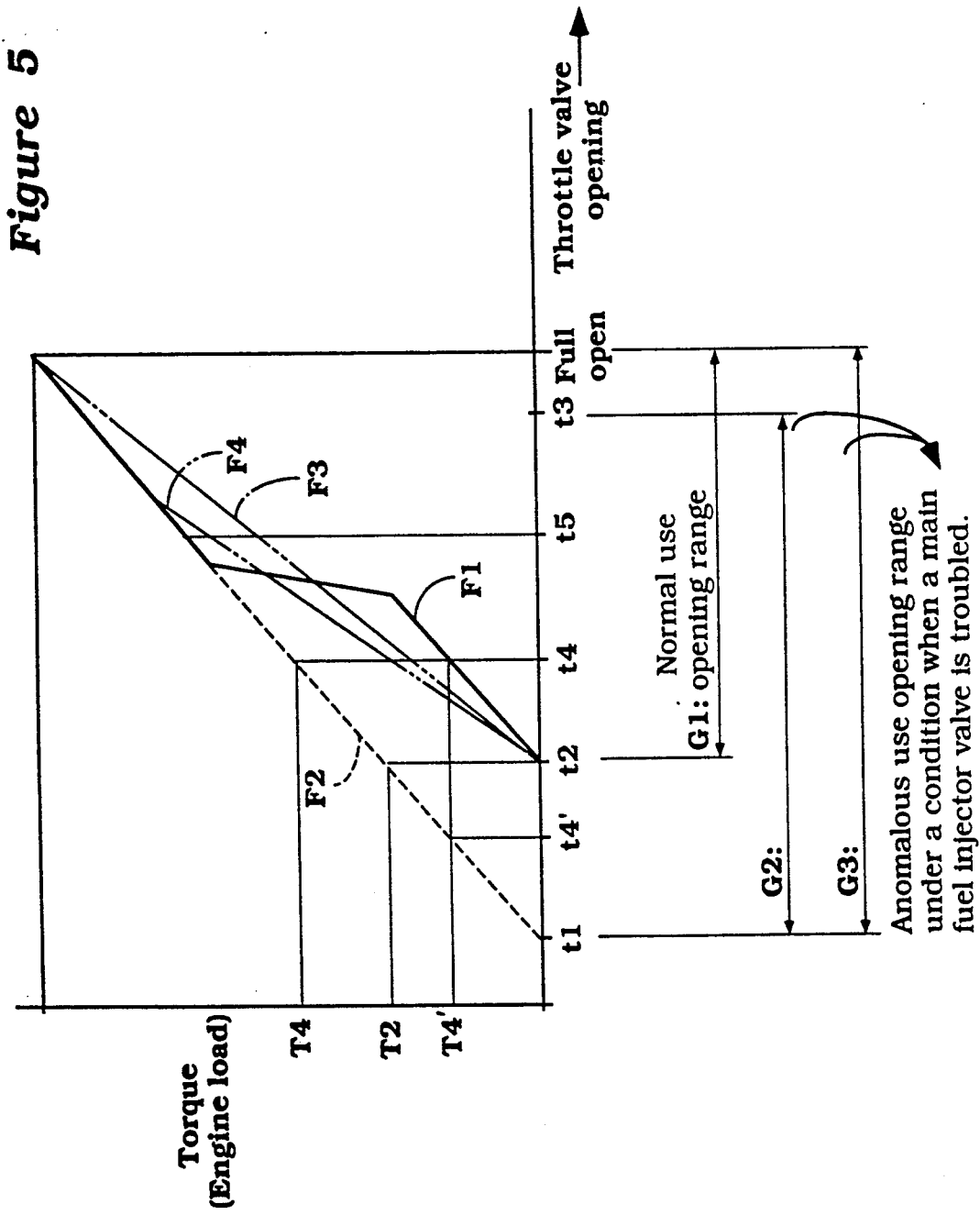
FIG. 5 is a graphical view showing how the fuel control is effected in the amount of a malfunction.

A main fuel/air injector assembly, indicated generally by the reference numeral 37, is provided for delivering a fuel/air charge directly to the combustion chamber 26. This fuel/air injector assembly 37 may be of any known type, for example, of the type shown in the copending application in which I am a coinventor, Ser. No. 591,798, filed Oct. 2, 1990, entitled "Fuel Injection System For An Engine", and assigned to the assignee hereof. Specifically, the fuel/air injector 39 may be of the type as shown in FIGS. 4 and 5 of that application, the disclosure of which is incorporated herein by reference. Basically, the injector 37 is provided with a fuel injector 38, which receives fuel from a fuel manifold 39. Air is also supplied to the air/fuel injector 37 from an air manifold 41 and an injection valve 42 controls the admission of fuel and air to the combustion chamber 26 and is operated by an electrical solenoid 43. All of these components are mounted in a housing assembly, indicated generally by the reference numeral 44.

The air/fuel injector 37 may be operated by any desired type of fuel strategy which controls the amount of fuel supplied by the timing of the operation of the fuel injector 38 and by the timing of the opening and closing of the injection valve 42 by the solenoid 43.

An auxiliary fuel injector 45 is provided in the throttle body 21 and injects fuel into the common portion of the induction system 19 upstream of the throttle valve 22.

In the illustrated embodiment, the throttle valve 22 is operated by a so-called "drive by wire" system. This system includes an accelerator pedal 46 that is operated by an operator in a known manner and which includes some form of position sensing device that outputs a signal a indicative of accelerator position to an electronic control unit (ECU), indicated generally by the reference numeral 47. The ECU 47 then outputs a control signal C to a servomotor 48 which is coupled to the throttle valve 22 for positioning the throttle valve in response to operator demand.

In the illustrated embodiment, the induction system 19 is constructed in such a way that the throttle valve 22 is normally positioned in a substantially closed position $T_2$ when the engine 11 is idling. Idle air flow is controlled by providing an idle air bypass 49 having a throttle 51 which is electronically controlled through a signal E from the ECU 47.

The ECU 47 also outputs a signal A to the solenoid 43 for controlling the timing and duration of the opening of the injector valve 42 and an output signal B to the fuel injector 38 for controlling the time and duration of fuel injection. In addition, the ECU 47 outputs a signal D to the auxiliary fuel injector 45 for controlling the timing and duration of injection by this injector.

In addition to the aforenoted signals, the ECU may receive any of a number of signals indicative of engine condition. In the illustrated embodiment, the induction system 19 is provided with an air/flow sensor 52 that is positioned upstream of the auxiliary fuel injector 45 and immediately downstream of the air inlet device, shown schematically at 53 in FIG. 2. This sensor 52 outputs a signal c to the ECU 47 so as to indicate the amount of air flowing to the engine. In addition, a sensor is provided for sensing the angular position and rotational speed of the crankshaft 16 and this signal b is transmitted to the ECU 47. In addition to air flow and crankshaft speed and angle, the ECU 47 may receive other signals indicative of either engine or ambient conditions, such as temperature or the like.

The ECU 47 is programmed to provide a control strategy for the main air/fuel injector 37 and the auxiliary fuel injector 45. Although any of a variety of types of strategies may be employed, it is generally preferred to have the main fuel injector 39 supply all or substantially all of the low and mid-range performance requirements of the engine. However, as the load and speed on the engine 11 increase, it is desirable to introduce additional fuel from the auxiliary injector 45. This permits better fuel control and, at the same time, insures adequate cooling of the engine and particularly the piston 14 under high speed, high load conditions. Of course, any of a wide variety of strategies may be employed.

In the illustrated embodiment, the auxiliary injector 45 is only a fuel injector. However, it is to be understood that the invention can be employed in conjunction with engines wherein the auxiliary injector 45 like the main injector 39 is an air/fuel injector. In a similar manner, the invention may also be practiced in conjunction with engines wherein the main fuel injector is only a fuel injector rather than an air/fuel injector.

FIG. 5 is a graphical view showing the torque of the engine in response to throttle valve opening and the curve F1 indicates one type of control strategy that may be employed as generally aforedescribed. The phantom line curves F3 and F4 show other types of control strategy. It should be noted that the range of throttle openings G1 between idle throttle opening $t_2$ and $t_{max}$ is less than with a conventional engine that would have a homogeneous air/fuel mixture delivered to the combustion chamber. As has been previously noted, the throttle valve 22 is held open to a greater extent because of the use of direct fuel injection than if a homogeneous mixture were supplied to the combustion chamber 26 through the induction system 19. The ECU 47 is programmed so as to provide the desired strategy.

In accordance with the invention, an arrangement is incorporated for sensing a malfunction of the main fuel injector 39 and adjusting the fuel supply by the auxiliary fuel injector 45 and shutting down the main fuel injector under this circumstance. Also, since the homogeneous mixture will than be supplied to the combustion chambers 26, the ECU 47 also closes the throttle valve 22 to a greater extent when direct injection is only being supplied to the engine.

Figure 6:
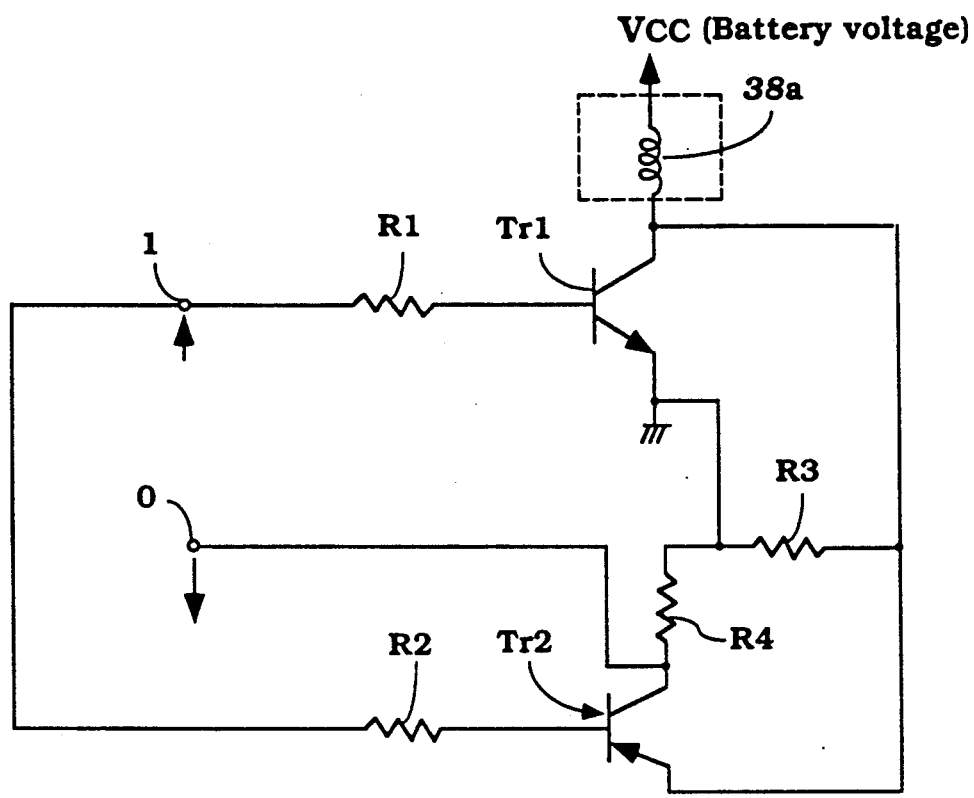
FIG. 6 is a graphical view showing the schematic wiring diagram for one method of how an abnormality in the operation of the main fuel injector is sensed.

FIG. 4 is a block diagram showing the relationship of the various controls. The main injector abnormal operating condition detector is indicated schematically in this figure at 54 and outputs a signal to a fuel injection control circuit 55 of the ECU 47 which controls the main fuel injector 38 and the auxiliary fuel injector 45. This detector may take the form of an electric circuit as shown in FIG. 6 which senses the operation of the solenoid of the main fuel injector 38 which solenoid is indicated in this diagram by the winding 38a. This circuit has an input point i which receives a signal from the ECU 47 and applies voltage through a resistor R1 to the base of a transistor TR1 so as to switch it on and apply battery voltage VCC to the winding during the period of fuel injection.

Figure 7:
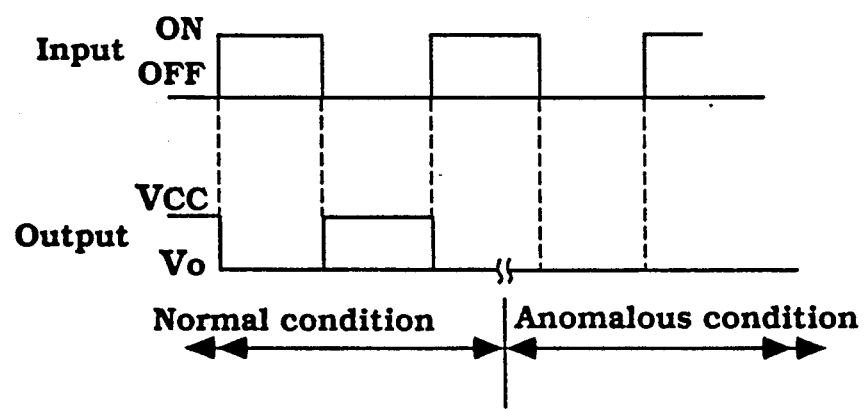
FIG. 7 is a graphical view showing the outputs of the circuit in FIG. 6 in the event of a normal and abnormal condition.

A sensing terminal 0 outputs a signal to the ECU 47 and this output signal is controlled by a second transistor TR2 that is in circuit with protective resistors R2, R3 and R4. When the coil 38a receives battery voltage VCC, the output at the terminal 0 will go from battery voltage VCC to a reduced voltage V$_0$ since the transistor TR2 is turned on when the base voltage is low. Thus as seen in FIG. 7, during normal operation, the signals i and 0 will be reciprocals of each other. However, if there is a break in the solenoid winding 38a, then the voltage signal at the terminal 0 will stay low and V$_0$ and the abnormal condition can be detected.

When the abnormal operation of the main fuel injector 39 is sensed, then the operation of the abnormal operating condition is initiated by the ECU 47. Although any of a variety of control strategies may be employed, a preferred embodiment will shut off the operation of the main fuel injector 39 and cause initiation of injection of the auxiliary fuel injector 45 and a decrease in the position of the setting of the throttle valve 22. This means that if the engine was operating at a condition when the auxiliary fuel injector 45 was not supplying any fuel, its fuel supply will be initiated. If, on the other hand, the condition was such that the auxiliary fuel injector 45 was supplying some fuel, then the amount of fuel supplied by it would be increased.

The amount of throttle valve position change may be understood best by reference to FIG. 5. In this figure, the broken line curve F2 shows the throttle opening and torque of the engine when operating only with the homogeneous mixture being supplied through the induction system 19. It should be noted that if the abnormal condition occurs at the throttle opening T4, considering the mode of operation of the curve F1, then in order to produce the same torque T4', the throttle valve must be closed to the position t4'. This will produce the same power output for the engine and, hence, the speed of the engine will not be abruptly increased. If the failure occurs when operating at the idle condition with the throttle valve in the position $t_2$, then the program requires the throttle valve condition to be moved to the condition t1. In fact, if this situation occurs, it may be necessary to provide further correction of the idle air flow set by the device 51. However, this may not normally be required depending upon the running conditions of the engine.

The malfunction operation as thus far described has dealt with the condition only in a single cylinder. However, it should be understood that in a multiple cylinder engine with individual main fuel injectors and a common auxilary injector, when any one of the main fuel injectors malfunctions, all of the main fuel injectors will be shut down as the auxiliary fuel injector has its fuel supply changed to compensate for this. In a system wherein there are separate main and auxiliary fuel injectors for each cylinder, it may be possible to control only the injectors for the cylinder wherein the main fuel injector is malfunctioning.

It should be readily apparent from the foregoing description that the described system provides good fuel control for the engine and good economy by providing main and auxiliary fuel injectors, while at the same time, providing for continued ability to operate the engine even in the event of an abnormality of the operation of the main fuel injector. In the illustrated embodiment, this is done by shutting down the main fuel injector, increasing the amount of fuel supplied by the auxiliary fuel injector and decreasing the throttle valve setting. Of course, various other changes may be made without departing from the scope of the invention, as defined by the appended claims.

We claim:

1. A fuel injection system for an internal combustion engine having a combustion chamber, an induction system for introducing a charge into said combustion chamber, throttle valve means for controlling the flow through said induction system, a main fuel injector for injecting fuel directly into said combustion chamber, an auxiliary fuel injector for injecting fuel into said induction system, means for sensing an abnormal condition of said main fuel injector, and means for operating said auxiliary fuel injector to supply a different amount of fuel to said engine in the event an abnormal condition of said main fuel injector is sensed.

2. A fuel injection system as set forth in claim 1 wherein the operation of the main fuel injector is stopped in the event the abnormal condition is sensed.

3. A fuel injection system as set forth in claim 2 wherein the amount of fuel supplied by the auxiliary fuel injector is increased in response to the abnormal condition.

4. A fuel injection system as set forth in claim 1 further including means for changing the position of the throttle valve means in the event an abnormal condition is sensed.

5. A fuel injection system as set forth in claim 4 wherein the operation of the main fuel injector is stopped in the event the abnormal condition is sensed.

6. A fuel injection system as set forth in claim 5 wherein the degree of opening of the throttle valve is reduced when the abnormal condition is sensed.

7. A fuel injection system as set forth in claim 3 wherein the amount of fuel supplied by the auxiliary fuel injector is increased in response to the abnormal condition.

8. A fuel injection system as set forth in claim 1 wherein the main fuel injector injects fuel and high pressure air directly into the combustion chamber.

9. A fuel injection system as set forth in claim 8 wherein the operation of the main fuel injector is stopped in the event the abnormal condition is sensed.

10. A fuel injection system as set forth in claim 8 wherein the amount of fuel supplied by the auxiliary fuel injector is increased in response to the abnormal condition.

11. A fuel injection system as set forth in claim 8 further including means for changing the position of the throttle valve means in the event an abnormal condition is sensed.

12. A fuel injection system as set forth in claim 11 wherein the operation of the main fuel injector is stopped in the event the abnormal condition is sensed.

13. A fuel injection system as set forth in claim 12 wherein the degree of opening of the throttle valve is reduced when the abnormal condition is sensed.

14. A fuel injection system as set forth in claim 1 where in the engine operates on a two-stroke, crankcase compression principle and the induction system includes a crankcase chamber associated with the respective combustion chamber.

15. A fuel injection system as set forth in claim 14 wherein the main fuel injector injects fuel and high pressure air directly into the combustion chamber.

16. A fuel injection system as set forth in claim 15 wherein the amount of fuel supplied by the auxiliary fuel injector is increased in response to the abnormal condition.

17. A fuel injection system as set forth in claim 14 further including means for changing the position of the throttle valve means in the event an abnormal condition is sensed.

18. A fuel injection system as set forth in claim 17 wherein the operation of the main fuel injector is stopped in the event the abnormal condition is sensed.

19. A fuel injection system as set forth in claim 18 wherein the degree of opening of the throttle valve is reduced when the abnormal condition is sensed.

20. A method of operating a fuel injection system for an internal combustion engine having a combustion chamber, an induction system for introducing a charge into said combustion chamber, throttle valve means for controlling the flow through the induction system, a main fuel injector for injecting fuel directly into the combustion chamber, an auxiliary fuel injector for injecting fuel into the induction system, comprising the steps of sensing an abnormal condition of the main fuel injector, and operating the auxiliary fuel injector to supply a different amount of fuel to the engine in the event an abnormal condition of the main fuel injector is sensed.

21. A method as set forth in claim 20 wherein the operation of the main fuel injector is stopped in the event the abnormal condition is sensed.

22. A method as set forth in claim 21 wherein the amount of fuel supplied by the auxiliary fuel injector is increased in response to the abnormal condition.

23. A method as set forth in claim 20 further including the step of changing the position of the throttle valve means in the event an abnormal condition is sensed.

24. A method as set forth in claim 23 wherein the operation of the main fuel injector is stopped in the event the abnormal condition is sensed.

25. A method as set forth in claim 24 wherein the degree of opening of the throttle valve is reduced when the abnormal condition is sensed.

26. A method as set forth in claim 22 wherein the amount of fuel supplied by the auxiliary fuel injector is increased in response to the abnormal condition.

27. A method as set forth in claim 20 wherein the main fuel injector injects fuel and high pressure air directly into the combustion chamber.

28. A method as set forth in claim 27 wherein the operation of the main fuel injector is stopped in the event the abnormal condition is sensed.

29. A method as set forth in claim 27 wherein the amount of fuel supplied by the auxiliary fuel injector is increased in response to the abnormal condition.

30. A method as set forth in claim 27 further including the step of changing the position of the throttle valve means in the event an abnormal condition is sensed.

31. A method as set forth in claim 30 wherein the operation of the main fuel injector is stopped in the event the abnormal condition is sensed.

32. A method as set forth in claim 31 wherein the degree of opening of the throttle valve is reduced when the abnormal condition is sensed.

33. A method as set forth in claim 20 where in the engine operates on a two-stroke, crankcase compression principle and the induction system includes a crankcase chamber associated with the respective combustion chamber.

34. A method as set forth in claim 33 wherein the main fuel injector injects fuel and high pressure air directly into the combustion chamber.

35. A method as set forth in claim 34 wherein the amount of fuel supplied by the auxiliary fuel injector is increased in response to the abnormal condition.

36. A method as set forth in claim 32 further including the step of changing the position of the throttle valve means in the event an abnormal condition is sensed.

37. A method as set forth in claim 36 wherein the operation of the main fuel injector is stopped in the event the abnormal condition is sensed.

38. A method as set forth in claim 37 wherein the degree of opening of the throttle valve is reduced when the abnormal condition is sensed.

39. A fuel injection system as set forth in claim 1 wherein control means are provided for sensing running conditions of the engine and for effecting operation of one of the fuel injectors under one range of operating conditions of the engine and for operating the other of the fuel injectors under another operating condition of the engine.

* * * * *